United States Patent
Logan et al.

(10) Patent No.: US 9,439,530 B2
(45) Date of Patent: Sep. 13, 2016

(54) INTELLIGENT COOKING APPARATUSES AND METHODS

(71) Applicant: Twin Harbor Labs, LLC, Plano, TX (US)

(72) Inventors: James D Logan, Candia, NH (US); Eric Carr, Plano, TX (US); Richard A Baker, Jr., West Newbury, MA (US)

(73) Assignee: Twin Harbor Labs, LLC, Plano, TX (US)

( * ) Notice: Subject to any disclaimer, the term of this patent is extended or adjusted under 35 U.S.C. 154(b) by 0 days.

(21) Appl. No.: 14/993,259

(22) Filed: Jan. 12, 2016

(65) Prior Publication Data

US 2016/0198885 A1    Jul. 14, 2016

Related U.S. Application Data

(60) Provisional application No. 62/102,623, filed on Jan. 13, 2015.

(51) Int. Cl.
| | |
|---|---|
| *A47J 37/12* | (2006.01) |
| *A47J 43/28* | (2006.01) |
| *A47J 27/62* | (2006.01) |
| *G09B 19/00* | (2006.01) |

(52) U.S. Cl.
CPC ............ *A47J 27/62* (2013.01); *G09B 19/0092* (2013.01)

(58) Field of Classification Search
CPC ........ A47J 45/068; A47J 36/00; A47J 27/00; A47J 44/00
USPC .................... 99/325–328, 330–333, 337, 342
See application file for complete search history.

(56) References Cited

U.S. PATENT DOCUMENTS

| | | | |
|---|---|---|---|
| 5,549,382 A | 8/1996 | Correia et al. | |
| 5,746,114 A | 5/1998 | Harris | |
| 7,326,888 B2 | 2/2008 | Chun et al. | |
| 8,172,107 B2 * | 5/2012 | Hoffman | A47J 36/025 219/433 |

(Continued)

FOREIGN PATENT DOCUMENTS

| | | |
|---|---|---|
| CN | 101461655 A | 6/2009 |
| CN | 103196164 A | 7/2013 |

(Continued)

OTHER PUBLICATIONS

Elgan, Mike, "Cook Smarter With New Wi-Fi Kitchen Gadgets", Houzz, Oct. 29, 2013, Downloaded from http://www.houzz.com/ideabooks/19367347/list/cooksmarterwithnewwifikitchengadgets on Nov. 23, 2015.

(Continued)

*Primary Examiner* — Dana Ross
*Assistant Examiner* — Lindsey C Teaters
(74) *Attorney, Agent, or Firm* — Richard A. Baker (57) ABSTRACT

Intelligent cooking apparatuses incorporate wireless communication technology to carryout cooking procedures. More specifically, stoves, ovens, and cookware may send and receive data wirelessly to carryout cooking procedures. An application may guide persons through recipes and automate many of the cooking procedures. Cookware may send batch information to an application for processing, display, and analysis. Cookware may use hardware for automated cooking actions, such as a magnetic stirrer and driver for stirring the contents in cookware, all monitored by various sensors located in the cookware.

20 Claims, 4 Drawing Sheets

(56) References Cited

U.S. PATENT DOCUMENTS

| | | | |
|---|---|---|---|
| 8,730,038 B2 * | 5/2014 | Durian | F24C 7/08 126/21 A |
| 9,123,234 B2 | 9/2015 | Jung et al. | |
| 2002/0050211 A1 * | 5/2002 | Ng | A47J 27/0802 99/331 |
| 2013/0092032 A1 * | 4/2013 | Cafferty | F24C 7/08 99/325 |
| 2014/0199454 A1 * | 7/2014 | Storek | A47J 36/32 426/508 |
| 2014/0260998 A1 * | 9/2014 | Pearson | A47J 27/002 99/288 |
| 2015/0114236 A1 | 4/2015 | Roy et al. | |
| 2015/0149120 A1 * | 5/2015 | Burkhardt | A47J 36/32 702/189 |
| 2015/0157161 A1 * | 6/2015 | Lagerlof | A47J 27/62 99/332 |
| 2015/0208858 A1 | 7/2015 | Robbins et al. | |
| 2016/0029843 A1 * | 2/2016 | Thielman | B65D 35/28 222/95 |
| 2016/0066744 A1 * | 3/2016 | Baxi | A47J 36/32 99/343 |

FOREIGN PATENT DOCUMENTS

| | | |
|---|---|---|
| CN | 103196165 A | 7/2013 |
| CN | 104049548 A | 6/2014 |
| EP | 2843965 A1 | 3/2015 |
| WO | 2012054908 A2 | 4/2012 |
| WO | 2013096136 A1 | 6/2013 |

OTHER PUBLICATIONS

Shen, Chen, "This mart wok can cook up stir fry meals while you're away (Video)", Boston Business Journal, Dec. 12, 2014, downloaded from http://www.bizjournals.com/boston/blog/startups/2014/12/thissmartwokcancookupstirfrymealswhile.html on Dec. 12, 2014.

Evans, Humberto, "Pantelligent: Intelligent Pan—Cook Everything Perfectly", Kickstarter, downloaded from https://www.kickstarter.com/projects/hevans/pantelligent-intelligent-pan-cook-everything-perfe on Jan. 15, 2015.

Lovejoy, Ben, "The latest contender for your automated kitchen: then $200 smart frying pan", 9tp5mac.com, Nov. 21, 2014, downloaded from http://9to5mac.com/2014/11/21/smartfryingpan/ on Nov. 23, 2015.

* cited by examiner

INTELLIGENT COOKING APPARATUSES AND METHODS

RELATED APPLICATIONS

This patent application is a non-provisional application of, and claims the benefit of the filing dates of, U.S. Provisional Patent No. 62/102,623 filed on Jan. 13, 2015 entitled Intelligent Cooking Apparatuses and Methods. The disclosures of this provisional patent application is incorporated herein by reference.

BACKGROUND OF INVENTION

1. Field of the Invention

The present invention relates to stoves, ovens, cookware, and cooking devices. More specifically, the present invention relates to cooking apparatuses and methods for wirelessly carrying out cooking procedures.

2. Description of the Related Art

While little has changed in cookware in the past century or so, the needs of today's cook have changed over time. Today's cooks are expected to have all components of the meal completed at the same time. Today's cooks are expected to keep all meal components at the perfect temperature until served, a feat that may require stirring to avoid food from burning to the bottom of the pan. And today's cooks need a way to walk away while the food is cooking to attend to other chores. We address each of these expectations in the following invention.

Conventional stoves, ovens, and cookware do not provide cooks with much feedback as to the status of the contents in the cookware. Cooks have to rely on sight, smell, and timers to determine the status of the contents in the cookware. Relying on a person's sight and smell introduces human error to the cooking process. The suggested cooking time may change depending on the oven, stove, cookware used. In addition, altitude and ambient temperature may affect the suggested cooking time.

Cooks have to rely on thermometers, heating controls, and manual stirring to prepare food. All of which require the cook to be proximal the cookware. Requiring the cook to be near the cookware to perform actions wastes the time of the cook. Many cooking procedures require the cook to adjust the heat to properly prepare food. This may require the cook to further monitor the stove, oven, and cookware to determine when the heat should be adjusted. Monitoring the food and adjusting the heat wastes time.

The cooking of some dishes requires great skill and elaborate methods. Without spending an inordinate time practicing these dishes, they are hard to master or even create. Cooking logs and diaries are often used to documents and track methods used because of the many variables involved in creating some dishes. Failure to execute a cooking step at the opportune moment may take away from the intended taste of a dish.

Stirring is one common cooking step that usually requires a person to stand over the cookware and move a cooking tool. Stirr, is an automatic sauce stirring device that sits in a pan. Stirr is bulky and works only in cookware with contents that do not surpass a specific height. The odd shape of Stirr makes it a hassle to clean after use. In addition Stirr requires a person to manually press buttons on the device to carryout cooking procedures.

Many cooking procedures require the covering and uncovering the contents of cookware. A cook usually places or removes a lid in order to cover and uncover the contents of the cookware. Further, the cook is usually supposed to place or remove the lid at an opportune moment for best cooking results. Once again, this requires a cook to monitor the food for the opportune moment and be proximal the cookware for moving the lid. In addition, the cook may miss or forget steps in concurrent cooking procedures because of the time and attention required for monitoring the food and moving the lid.

Conventional stoves, ovens, and cookware do not interface with cooking recipes. Cooking recipes are generally followed by reading the instructions, then following the instructions. Many cooking recipe applications exist but they generally only allow the user to read recipes, read recipe reviews, save recipes, add recipes, and rate recipes. The present invention allows applications to interface with the stove, oven, and cookware.

The present invention eliminates the issues articulated above including additional issues with conventional cooking procedures. Moreover, the present invention allows for a more precise and structured cooking experience for cooks of all skill levels.

SUMMARY OF THE INVENTION

A system for cooking in a kitchen the includes a smart phone with a transceiver and an application (an "app", or a computer program) where the app tells the cooking apparatus how to cook food by sending and receiving messages from a cooking apparatus. The cooking apparatus has a base and walls for holding in the food and a handle that attaches to the wall. The handle includes a computer that has a processor, a transceiver that talks with the smart phone, a volume sensor for checking the volume of food in the cooking apparatus, and a power supply.

The cooking apparatus also may include a viscosity sensor, a smell sensor, a pressure sensor, a gradient temperature sensor, or a saline sensor. The power supply could get some of its power from the heat in the cooking apparatus. The handle may include a reservoir for storing liquid, and releasing the liquid under control of the processor. The cooking apparatus may also have a vent for releasing heat under control of the processor.

An intelligent cooking apparatus for use in a kitchen that has a base and walls for holding in the food and a handle that attaches to the wall. The handle includes a computer that has a processor, a transceiver that talks with the smart phone, a plurality of sensors for checking the cooking of food in the cooking apparatus, and a power supply. The plurality of sensors may include a pressure sensor, a viscosity sensor, a smell sensor, a pressure sensor, a gradient temperature sensor, or a saline sensor. The power supply could get some of its power from the heat in the cooking apparatus. The handle may include a reservoir for storing liquid, and releasing the liquid under control of the processor. The cooking apparatus may also have a vent for releasing heat under control of the processor.

A stirrer that can sense characteristics of the contents in cookware and relay data to cooking apparatuses and applications.

A scrapper that can sense characteristics of the contents in cookware and relay data to cooking apparatuses and applications.

Cookware that automatically covers and vents during cooking procedures.

An application with cooking recipes and/or programs that use cooking devices (e.g., stirrer, scrapper), cookware, and cooking appliances to carryout cooking procedures.

An application that records and stores batch information from sensed characteristics during cooking procedures.

DETAILED DESCRIPTION OF THE INVENTION

The detailed description for Intelligent Cooking Apparatuses and Methods first includes an overview of the major components of the Cookware. Second, the communication and sensing means for cooking apparatuses are described. Next, the compilation of batch information is described. Lastly, an application that uses the functionalities of cooking apparatuses is described. The term "contents" is used to describe the medium found in cookware throughout the detailed description.

The present invention involves apparatuses and methods for carrying out cooking procedures. Cooking appliances, cooking devices, and cookware may send and receive data wirelessly to carryout cooking procedures. Cookware may include pots, pans, skillets, Dutch ovens, roasters, baking sheets, and the like.

Cookware may contain hardware for automated cooking actions. For example, a magnetic stirrer may be spring loaded into the handle of a pot. An orifice in the pot that is slightly larger than the diameter of the stirrer may house the stirrer through the use of a spring latching mechanism. As soon as the stirrer is pressed far enough into the orifice, a compression spring compresses until a latch engages the stirrer, holding the stirrer in place. When the pot receives a wireless signal to use the stirrer, the latch may disengage, allowing the spring to stretch, pushing the stirrer into the pot. The pot will need to have a receiver that connects to a latching mechanism for this example. Alternatively, no spring may be used to house the stirrer in the pot. Instead, an electromagnet may hold the stirrer in place. In this example, a small coil in the pot receives power that attracts the magnetic pole of the stirrer, holding it in place. Once the pot receives a wireless signal to use the stirrer, the power sent to the coil is stopped, releasing the stirrer into the pot. In another example, a pot may include a lid that automatically covers and uncovers all or a portion of the contents in the pot. Covering and uncovering cookware is important for various cooking procedures. Cookware with automated lids allows cooking procedures to be carried out without the presence of a person.

Cookware may detect and monitor various states of the contents in the cookware, the heat source, and the cookware itself. Cookware may monitor the temperature of the contents or contact area on the cookware. Cookware may monitor the volume of the contents. For example, a pressure sensor embedded or connected to cookware may determine the volume of the contents in the cookware. Cookware may monitor the viscosity of the contents. Cookware may determine evaporation rates for the contents. Cookware may monitor the amount of time elapsed based on threshold temperature. A pressure sensor embedded or connected to the may determine the volume of the contents in the cookware. A smell sensor could be used to determine certain characteristics of the food, such as burning, or the correct mix of ingredients.

Cookware can wirelessly communicate with a cooking appliance or cooking device to perform actions. Remote devices include smart phones, tablets, computers, universal home remotes, and the like. Cookware may detect parameters that trigger the cookware to send a signal to the stove or oven to adjust a setting. For example, a pan detects that it is too hot for a given cooking procedure. The pan then sends a signal to the stove to reduce the heat. Alternatively, the pan may send the signal to the remote device which relays a signal to the stove. Control of the stove from the cookware or from a smart phone app could be via Wi-Fi to a processor on the stove which adjusts the heat, or could be to a device such as the Meld smart knob that turns the knob on a stove using Wi-Fi signals.

The smart phone app could provide a user interface to control both the stove and the cookware. Of course, the smart phone could be replaced by a tablet, a personal computer, a laptop, or the stove itself, using the stove LCD screen. In each, voice control over the app is possible, allowing the user to perhaps say "cook oatmeal for 6 AM", and leave the handle full of water and the oatmeal in the pot. At 5:30 AM, the app would direct the cookware to release the water into the oatmeal, start the stirrer and cause the stove to heat to high until boiling was detected, and then lower the heat to low. By 6 AM, the oatmeal would be ready.

In one embodiment, preassembled food could be sealed in a package could be purchased at a store. Or the user could prepare the dinner in the morning and place it in a waxy substance to prevent absorption of the water. The user could be instructed to place the bag or prepared food into a pot of cold water, perhaps with ice to preserve the food during the day. When the user starts his journey back home, he could contact the stove through his smart phone app and turn on the stove to heat the pot. Or he could set a timer in the morning to start cooking at a set time. The heat could melt the waxy substance which would then float to the top of the water and away from the food. Or the store bough bag could cook the food in the bag. When the user arrives home, dinner would be ready.

The apparatuses and methods described herein should be understood to function from an open or standard interface. People can use smart phones and applications to craft recipes and control the cooking apparatuses described. Further, the electrical components of the cooking apparatuses may be modified, re-configured, and added to.

Batch information, including temperature, volume, and viscosity, may be transmitted wirelessly from the cookware to an external storage medium such as a cloud. Batch information may be used to create and revise recipes. Recipes can include the heating profile, stirring profile, venting, covering, volume measurements, and viscosity requirements. Recipes may require covering cookware as the contents heat to a rolling boil while stirring, then the cookware may vent while discontinuing the stirring and lowering the heat to a simmer. Cookware may calibrate by using a control recipe to determine the accuracy of the cooking devices and sensors. For example, a control recipe may use water in cookware to ensure that the sensors detect when the water is actually boiling. The control recipe may use an acoustic sensor to determine that the water is boiling while simultaneously checking to see if the temperature is at least equal to a boiling temperature. Similarly, the viscosity and temperature sensors may communicate to perform quality control actions. For example, if the temperature sensor senses that water is boiling at 110 degrees Celsius, the viscosity sensor should sense a viscosity of about $$0.255 \frac{g}{m*s}.$$

In addition, once the cookware determines that the water is boiling the viscosity may be checked against known values for boiling water. Cookware may send batch information to a storage medium for processing and analysis. For example, batch information may be processed by an application that also receives inventory information for a kitchen. Using data analytics from the combined batch information and inventory information the application can determine the quantity of the remaining food items in the inventory.

Determining whether the contents of the cookware are boiling or simmering is an interesting problem. One method is to place a microphone in the cookware and listen to the sounds coming from the contents. These sounds can then be compared to the stored sounds for boiling or simmering. This method will work when stirring the contents. The design of this method involves placing a microphone inside of the top of the pot. For instance, PUI Audio offers a line of waterproof microphones. These electret condenser microphones are certified to IP57 standards, which means they can be submerged in water or processed through aqueous cleaning systems.

Another method is to use sensors to detect the temperature at several levels in the pot. The bottom of the pot will be hotter, as it is close to the heating elements. With a simmer, there will be heat gradients to the top, where the surface area will allow for cooling. When the pot is in a rolling boil (or when the pot is stirred), the turbulence of the boiling will mix the contents creating a more uniform temperature throughout the contents. The design for this method involves incorporating a set of temperature sensors (thermocouples) into the wall of the pot, either in direct contact with the contents of the pot, inside the wall of the pot, or on the outside of the pot. The sensors would have to be calibrated to account for their position on the wall of the pot. It is anticipated that the sensors would be placed evenly from the bottom to the top of the pot, perhaps every few millimeters. This string of temperature sensors could also be used to determine the volume in the pot, as there will be a sharp temperature difference at the surface of the contents.

A third method involves monitoring the weight of the contents, and determining the level of boiling based on the decrease in weight. This method requires a scale either on the stove or within the pot.

Alternatively, the rate of change in the volume of the contents could be used. The volume could be determined with the temperature sensor string above or it could use a series of conductivity sensors to determine the level of the contents. A conductivity sensor would also be useful for determining the salinity of the contents.

Cookware may record the temperature, volume, and viscosity over a period of time and stored on memory as batch information. The batch information can be displayed on a graph over the period of time recorded. A cook can use the graphed batch information to determine differences and mistakes in specific batches. The batch information can be shared on social cooking applications. Interested cooks can then view batch information to perfect dishes. For example, a novice cook has a recipe for chocolate chip cookies but the cookies always turn out hard. An expert cook may share batch information for moist chocolate chip cookies. A novice cook may view the batch information then make adjustments in cooking procedure to replicate the moist chocolate chip cookies.

Cookware may have various hardware features that can be controlled using wireless communication from the stove or another device, such as a smart phone. Control via wireless communication may be carried-out using open or standard interfaces. These hardware components may include embedded thermocouples, automatic lids, Bluetooth, etc. Cookware may include a covering which opens, closes, or otherwise moves when the cookware receives a wireless signal. Some hardware components may be insulated in the outer walls of the cookware to protect the hardware components from the heat. Other hardware components may be strategically places in the handles, lids, or sides of cookware.

The material of cookware may be composed of a material that allows for embedded wiring. Although many materials can work with embedded wiring, some materials are preferred for the use of embedded wiring. The material may also need to be nonmagnetic for some of the features of the pot to operate. For example, a pot may have a stirring function, in this case, the pot should be composed of a material with low magnetization. Examples of common materials found in cookware include: Pyrex, ceramic, glass, layered materials, composites, glass, aluminum.

Ovens, stoves, and cookware may use proximal sensors to determine varying cooking parameters and statuses. Cookware may use an infra-red sensor to detect the temperature from an IR sensor. The IR sensor may be attached to the pot or another area proximal the stove to detect the temperature of the pot and/or its contents. A camera may be placed proximal to the cookware for monitoring of the cookware contents. The camera may relay pictures or video to a device for monitoring.

The camera may use the time-of-flight from a light pulse to determine the depth of contents within the cookware. A time-of-flight camera or similar range imaging (e.g., LIDAR) may be employed to calculate the depths of contents in the cookware. Alternatively, an RF device may be employed to sense various depths. The RF device may be pointed downwards from atop the appliance or attach to the top of the cookware. Different arithmetic should be used to determine the depth of the contents in the cookware depending on the positioning of the time-of-flight camera. For example, if a time-of-flight camera first senses the bottom of the cookware is thirty-six cm away, then contents are added to the cookware, now the time-of-flight camera senses the top of the contents are twenty-eight cm away, the depth of the contents is eight cm. The depth may be multiplied by the inside area of the cookware to determine the volume of the contents for various cooking procedures.

Cookware may include a stirrer that is releasable from the pot. For example, the stirrer may be spring-loaded into the handle or side of the cookware. Alternatively, the stirrer may be held by a magnet on the side of the cookware of the handle of the cookware. The stirrer may operate from a driver embedded or connected to the bottom of the cookware. The driver may receive power from the stove or battery embedded or connected to the cookware. Power to the battery may be supplied from a conversion of heat to power. The stirrer may be composed of a magnetic material.

The magnetic material may be protected by an outside material. Materials, such as Teflon or plastic may be used.

The stirrer may require the cook to replace the stirrer after use. A stirrer may be neutrally buoyant. A stirrer may stay on the bottom. A stirrer may include a scrapper. A scrapper is connected to, or a part of the stirrer structure. Alternatively, a scrapper may be an entirely separate cooking device. The scrapper, scrapes the bottom of the cooker. The length of the scrapper may equal to the inner diameter of the cookware. Not all cookware is circular therefore the scrapper may have a smaller length.

Cookware may contain a battery or rechargeable battery. The rechargeable battery may be charged via induction from the heating element. Alternatively, the cookware may receive power directly through wiring.

Communication

Cookware, cooking devices, and cooking appliances (collectively, "cooking apparatuses") may wirelessly communicate with one another directly or through an application. In a preferred embodiment, the devices communicate using low energy Bluetooth under the Bluetooth Core Specification Version 4.0. Bluetooth Smart should be adopted as the primary wireless network technology for cooking apparatuses as soon as its development is complete. A connection between two Bluetooth devices is initiated by an inquiring device sending out an inquiry message searching for other devices in its vicinity. Any other Bluetooth device that is listening by means of conducting an inquiry scan, will recognize the inquiry message and respond. The inquiry response is a frequency hop synchronization packet containing all of the information required by the inquiring device to address the responding device. The inquiring device will become the master and the responding device will become the slave in the eventual wireless network, if a connection is established.

Once a connection is established between the Bluetooth devices, more interesting networked activities can be accomplished. Bluetooth provides useful protocols and procedures for facilitating these higher level activities. One procedure of particular interest is device bonding or pairing. Bonding is relevant to Bluetooth connections between devices where authentication is required. Authentication usually involves an exchange of secret information between the devices to ensure that only authorized devices have access to particular services. Access to particular services is important for carrying-out cooking procedures. Bonding streamlines the authentication process by allowing the device authentication information to be retained after the two devices have become disconnected. Once a person has authenticated a cooking device the device will immediately be recognized next time it is used for cooking. Bluetooth provides the hardware and software necessary to create a wireless network between cooking apparatuses. An application provides the specific commands for the cooking apparatuses to carryout cooking procedures using cooking recipes and programs.

Radio frequency, infrared, and near-field communication may also be used to carryout wireless communication between cooking apparatuses. The wireless communications may be performed by a transceiver 32. The transceiver may have an antenna, a radio for wireless communications, phy functionality to encode and decode the signals to and from the radio, and perhaps other circuitry or one or more processors for decoding and encoding the communications protocols. Transceivers are well known and other common embodiments could also be used.

In one example, a person is leaving work and would like to have soup as soon as he/she arrives home in ten minutes. Before leaving work that morning, the person placed the soup and a stirrer in cookware on the stove. The person can use a smart phone to run an application to turn on the stove on medium heat and activate the stirrer to spin slowly. Without having to check on the soup, the cookware and stove can monitor the soup so that it does not spill over or burn. Cookware and/or the stirrer may have a build in thermometer to sense the temperature of the soup. The application may set threshold temperatures for the soup. If the threshold temperature is met then the stove automatically lowers the heat.

In one embodiment, water or broth could be stored in a reservoir in the handle of the pot, and if the cookware determines that the soup is starting to boil off too much liquid, the water or broth could be released into the soup either automatically or under control of a remote user utilizing an app on a smart phone.

Cooking apparatuses may provide many functionalities to allow a person to save time and monitor cooking procedures. Wireless commands may toggle power to cooking apparatuses and adjust the levels of cooking settings. Wireless commands allow cookware to activate and control a cooking device, such as a stirrer or scrapper. Cookware may have various hardware features that can be controlled using wireless communication from the stove or another device, such as a smart phone.

Cookware may include a mechanism that covers as well as vents cookware. In one embodiment, cookware contains an actuator that lifts and lowers a lid when a wireless command to lift or lower the lid is received by the cookware. Automatically lifting and lowering a lid on cookware is important to monitor the temperature and moisture inside the cookware, and for monitoring the common spillover problem found in the kitchen. Preventing boiling over or excessive foaming of the contents in cookware saves the user time for cleaning up the potential mess caused by such an event, as well as the time for monitoring if such event will occur. In addition, the cookware can communicate to the cooking appliance to lower or switch off the heat as soon as a spillover is detected.

A cooking apparatus or an application may activate a cooking device placed in the cookware, such as a stirrer or scrapper. Cookware may have various hardware features that can be controlled using wireless communication from a cooking apparatus or an application. An application may run on a smart phone, tablet, computer, or the like.

Sensing

Sensors may be wired into the cooking apparatuses. A cooking apparatus may have a plurality of sensors. Each sensor may measure a different property of the contents in the cookware. Electrical components that compose each sensor, including wiring, may be thermally protected by insulating material to prevent the electrical components from overheating.

A common sensor used in cooking apparatuses is a thermometer. A sensor for measuring temperature may be a resistance thermometer. A cooking apparatus may include a resistance thermometer to monitor the temperature of the contents. Multiple resistive thermometers may be employed to determine the temperature distribution of the contents in cookware. At a detected inhomogeneous temperature distribution in the contents, it is for example possible to increase the speed of the stirrer so that it can contribute to a more uniform distribution of heat to the contents. Sensing temperature throughout the contents is important to homogenize the temperature distribution within the cookware. This may prevent portions of the end product from being undercooked or burnt.

A cooking apparatus may monitor the viscosity of the contents. Knowing the viscosity of the contents is important for controlling cooking devices that may be placed in the cookware. For example, more power will need to be fed to an electromagnet that controls a stirrer in higher viscosity contents. In one implementation, a Brookfield viscometer is used to sense the viscosity of the contents. In another embodiment, differential pressures along with the temperatures sensed by resistive thermometers provide the viscosity values. In an alternate embodiment, flux can be used to determine viscosity of the contents, the flux can be derived from the electromotive force (e.g., Faraday's law, Gauss's law) or the pressure drop through a porous medium (e.g., Darcy's law). The flux will vary depending on temperature, pressure, and composition of the contents.

Cookware may monitor the volume of the contents. In one embodiment, the cookware can sense the height of the contents then multiply this height by $\pi r^2$ to compute the volume. Alternatively, a pressure sensor embedded or connected to the cooking apparatus may determine the volume of the contents. Further, vaporisation and evaporation will affect the volume of contents in cookware. Vaporisation and evaporation is also important to sense and monitor because cookware may be damaged if heat is applied to the cookware after the contents have vaporised or evaporated.

Cookware may use an infra-red (IR) sensor to detect the temperature. The IR sensor may be attached to the cookware or another area proximal the stove to detect the temperature of the cookware and/or its contents. Just as an IR sensor may be placed proximal cookware, cameras may be placed proximal the cookware to allow a person to monitor the contents from a remote location. In one example, the video stream is relayed to a smart phone of a person with an application for viewing the cookware.

Sensors may be placed in an operable position to measure the height or depth of the contents in the cookware. Sensors may also be placed at heights not to interfere cooking procedures. In one example, a temperature measuring sensor may be placed at a height on the cookware so the sensor can pass into the contents to be measured. It may be advantageous for sensors to be disposed in a position facing the center of the cookware. Facing sensors towards the center of the cookware prevents the sensors from sensing contents near the interior wall of the cookware. The interior wall of the cookware may be higher or lower than the contents. This can be important when the heating of cookware contents has a maximum temperature value that must not be exceeded.

A plurality of the same type of sensors may be used in a cooking apparatus to provide more accurate measurements of the contents in cookware. For example, multiple resistance thermometers may be placed inside a pot at different heights and depths. The resistance thermometers that are at a height greater than the top of the contents will be surrounded by air. The cooking apparatus or application may ignore thermometer readings with low thermal conductivity based on the premise that air has a lower thermal conductivity than the contents (in most cases) therefore measuring the temperature where likely no contents exists is useless for this application. Alternatively, measuring the ambient temperature outside of the cookware may be important for cooking procedures, such as, predicting cooking times.

Figure 1:
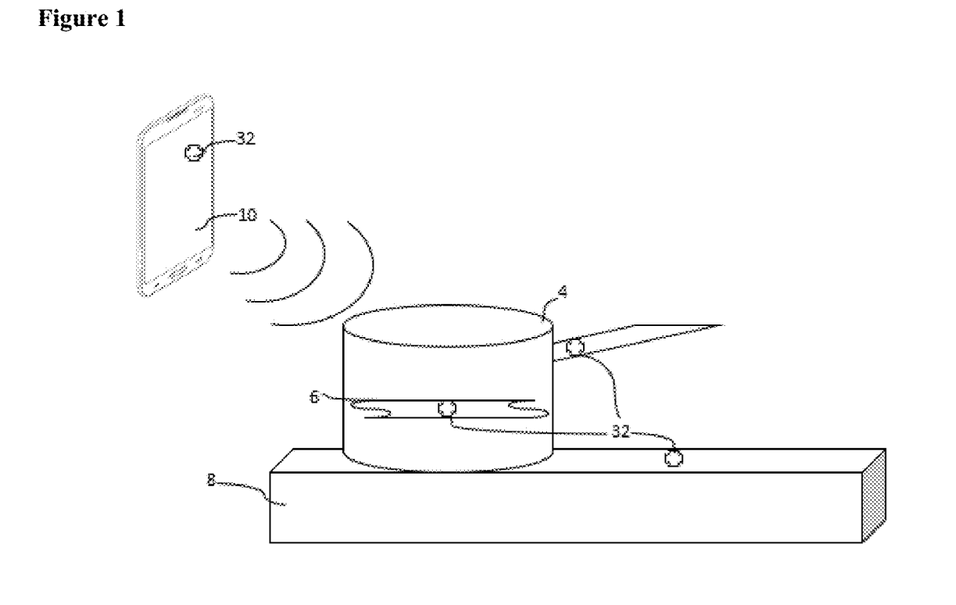
FIG. 1 is an illustrative schematic of the cookware, stirrer/scrapper, and stove communicating with an application.

FIG. 1 is an illustrative schematic of the cookware, stirrer/scrapper, and stove communicating with an application. Cookware 4 sits atop a burner on a stove 8 and includes a stirrer/scrapper 6. The cookware 4, stove 8, and stirrer/scrapper 6 all include a transceiver 32. A transceiver 32 is used for carrying out cooking procedures. A smart phone 10 also contains a transceiver 32. The transceiver 32 of the smart phone 10 functions through an application.

Batch Information

Batch information, including temperature, volume, and viscosity, can be transmitted wirelessly from a cooking apparatus to an external storage medium such as a cloud. A cooking apparatus may monitor the amount of time elapsed based on thresholds met by sensors to compile batch information. Thresholds may be set by an application, cooking apparatus, or manually input by a user. Using the data from the sensors, a cooking apparatus or application may record the status of the contents over time. By recording the status of the contents in the cookware, better end products may result, and a person can analyze the cooking process to improve on the cooking process in the future.

An application may send the batch information with corresponding recipes to a database or website. The batch information and recipes may be shared on the website allowing users to download, review, and comment. Cooking procedures may be tweaked and improved upon through the open sharing of batch information. Alternatively, the batch information can be stored privately and be used as a replacement for a cooking log or journal.

Cooking Devices: Stirrer and Scrapper

A stirrer and scrapper may include magnets and operate from the presences of electromagnetic forces. A rotating magnetic field may cause the stirrer or scrapper to rotate inside the cookware. The rotating field is created by a driver. A driver may be created either by a rotating magnet or a set of stationary electromagnets, placed beneath or around the cookware. Contents in cookware with large volumes and high viscosities require the stirrer or scrapper to have a greater magnetic force to operate. The stirrer or scrapper may be specifically designed for cooking operations to be neutrally buoyant. Neutrally buoyant stirrers and scrappers may increase cooking efficiencies and prevent the need for additional cooking devices. A neutrally buoyant stirrer or scrapper prevents the stirrer or scrapper from dropping or rising in the contents as the density of the stirrer or scrapper is equal to the contents. Magnetic stirrers and scrappers are preferred over traditional stirring and scrapping methods because they do require the presence of a person and they are quieter and more efficient. In addition, magnetic stirrers and scrappers are more easily cleaned than conventional cooking tools.

Cooking devices may have different shapes and sizes for specific applications. For example, the length of the scrapper may be equal to the inside diameter of the cookware so the entire inside bottom of the cookware can be scrapped. The scrapper may be entirely flat, or have a curved structure, or a combination of curved and flat surfaces. Alternatively, the scrapper may be shaped like a snowplow, so that the material on the bottom is scrapped up and rolled as the scrapper circulates around the pot. The scrapper may have an additional magnet to create enough force between the scrapper and inside bottom of the pan. In one implementation, the additional magnet may be placed in the center of the stirrer. In addition to the magnets used for the scrapper driver, an auxiliary magnet forces the additional magnet to the bottom of the cookware. In an alternate embodiment, the stirrer could be driven mechanically. A mechanical stirrer may be attached to the cookware or a separate cooking device.

Figure 2A:
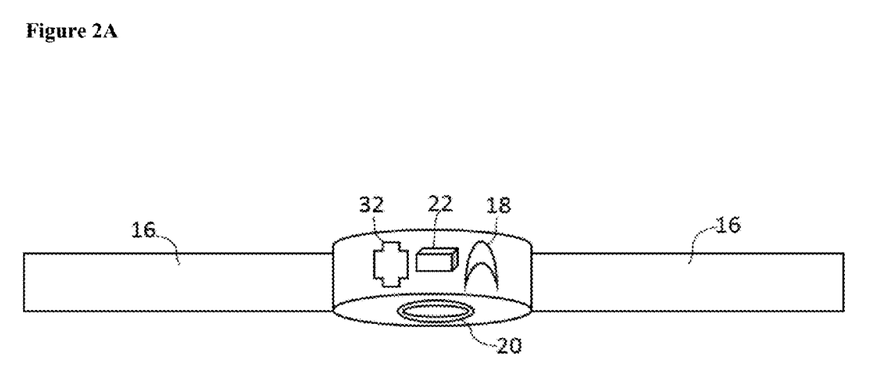
FIG. 2A illustrates a cooking device with flat surfaces and an additional magnet.

FIG. 2A illustrates a cooking device with flat surfaces and an additional magnet 20. A cooking device may angle the flat surfaces 16 at varying degrees to perform different functions (e.g., stirring, mixing, and scrapping). For example, the flat surfaces 16 may be angled at forty-five degrees to provide a more effective scrapping motion when the additional magnet 20 is attracted to a magnetic force from the auxiliary magnet in the driver. A cooking device may have a rechargeable battery 22 for powering a sensing module 18 and a transceiver 32. In one embodiment, sensing and transceiver modules are built-in to the cooking device so the cooking device has a symmetrical shape to provide uniform stirring. In a preferred embodiment, the transceiver module uses low energy Bluetooth to communicate to the cooking appliances, cookware, and application. For example, the heat and stirring may be adjusted on a stove using low energy Bluetooth signals from a smart phone.

In one embodiment, the smart phone could have an app that monitors the cooking and the stove. The app could detect when the user is leaving the home, and check the state of the cooking appliances. If the user leaves home and the appliances are left on, the app could warn the user that the cooking appliances are on, and suggest that the user turn the device off. The app could also provide the user with an option to remotely control the cooking appliance by turning it off or by starting a stirring mechanism. Alternatively, the stove could automatically turn off when the smart phone goes out of range, perhaps out of WiFi range indicating that the user has left the house.

There are a number of methods for determining that the smart phone (and its user) have left the home. The first is mentioned above, the ability to directly ping the smart phone from the cooking apparatus. A second method is by using GPS to determine that the phone is out of range. A third method uses RSSI or time of flight algorithms to determine the distance between the phone and the cooking appliance. A fourth method is to use the smart phone's accelerometers to determine that the phone is in a motor vehicle.

Figure 2B:
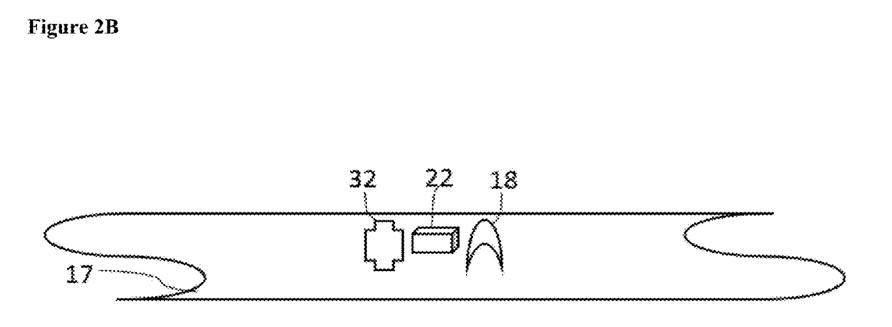
FIG. 2B illustrates a cooking device with curved surfaces.

FIG. 2B illustrates a cooking device with curved surfaces. A cooking device may angle the curved surfaces at varying degrees to perform different functions (e.g., stirring, mixing, and scrapping). A cooking device may have a rechargeable battery 22 for powering a sensing module 18 and a transceiver 32. In one embodiment, sensing and transceiver modules are built-in to the cooking device so the cooking device has a symmetrical shape to provide uniform stirring.

A driver may be manufactured into the cooking appliance or cookware. A driver may be added to cookware as a temporary or retrofit solution. Manufacturing a driver into each piece of cookware may be prohibitively expensive. The materials used in the cooking appliance and cookware must be composed so the necessary magnetic forces for a cooking device are uninterrupted. A temporary or retrofit driver may attach to the cookware and provide the force necessary to operate the cooking device. A temporary or retrofit driver may communicate with the cookware, cooking device, and cooking appliance to carryout cooking procedures.

Figure 3A:
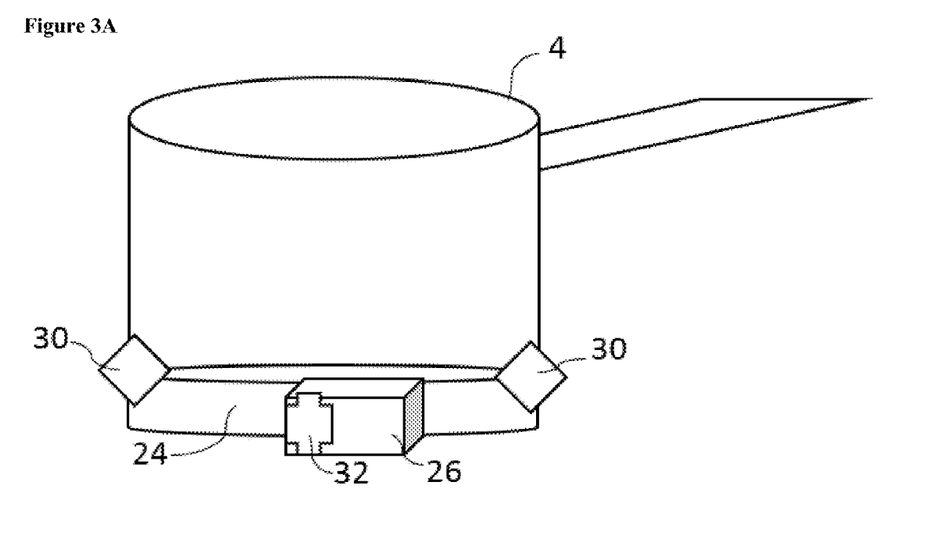
FIG. 3A illustrates a temporary or retrofit driver that operably connects to the bottom of cookware.

FIG. 3A illustrates a temporary or retrofit driver that operably connects to the bottom of cookware 4. A temporary or retrofit driver may include a battery 26, a rotating electromagnet 24, an attachment mechanism 30, and a transceiver 32. In this illustration a preferable attachment mechanism 30 is clamps that secure the driver to the bottom of the pan. This illustration uses a rotating electromagnet 24 to drive the cooking device. By turning a circular panel with an electromagnetic attached to the panel from under the cookware, a cooking device may rotate in the contents of the cookware. As the electromagnet moves on the circular panel, a rotating magnetic field is created. The rotating magnetic field allows a magnetic cooking device to move. Instead of a battery 26, the drive may plugged directly into an outlet, be wired to the cooking appliance, inductively powered from an appliance, thermally powered from an appliance, or otherwise receive power.

Figure 3B:
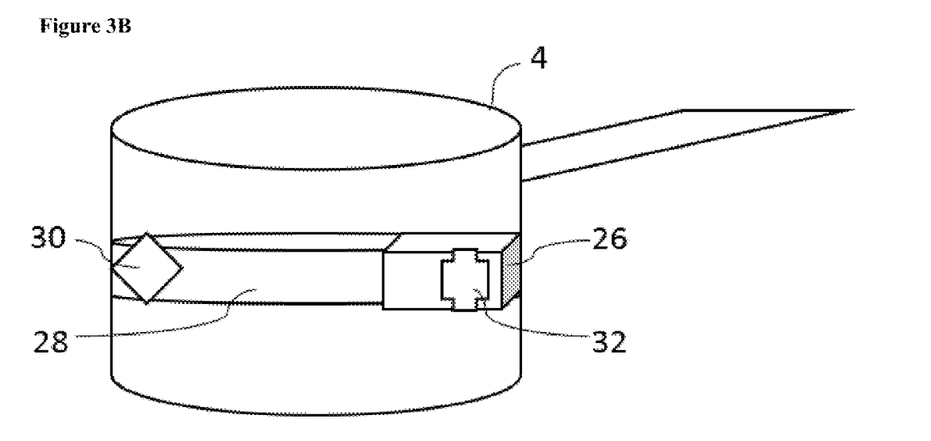
FIG. 3B illustrates a temporary or retrofit driver that operably connects around the cookware.

FIG. 3B illustrates a temporary or retrofit driver that operably connects around the cookware 4. A temporary or retrofit driver may include a battery 26, an electromagnet array 28, an attachment mechanism 30, and a transceiver 32. In one implementation, the magnet array 28 wraps around the cookware and the length may be adjusted by an attachment mechanism 30. A preferred attachment mechanism 30 may use a form of adjustable strap with a clip to secure the driver. Instead of a battery 26, the drive may plugged directly into an outlet, be wired to the cooking appliance, inductively powered from an appliance, thermally powered from an appliance, or otherwise receive power. Current passes through each consecutive electromagnet in the electromagnet array 28 to allow a cooking device to spin. In one embodiment, the array of electromagnets are operably connected to an actuator which sequentially steps a current through electromagnets. The magnetic cooking device is pulled to the sequentially energized electromagnets. The magnet array 28 may be placed at different heights on the cookware to cause the cooking device to spin at different heights in the contents of the cookware.

Application Using Cooking Devices, Cookware, and Appliances

An application for cooking may include the use of cookware, cooking devices, and appliances. An application uses cooking recipes and/or cooking programs to aid the user in cooking. An application may receive data from cookware, cooking devices, and appliances then perform various display functions to inform and instruct the user. An application may wirelessly communicate to carryout cooking functions. Cooking device, cookware, and appliances may each contain a receiver and/or transmitter. The receiver and transmitter may operate wirelessly by Bluetooth, radio frequency, infrared, or near-field communication. The wireless operations may be performed by a transceiver 32. An application may receive signals and evaluate the signals leading to a corresponding display function (e.g., not enough salt).

Once the program begins running, the application may include a lockout feature that causes it to block subsequent incoming program information received while another program is already running. A lockout feature may block incoming information and create a queue for subsequent incoming program information. Subsequent incoming program information that is placed in a queue may being running once a triggering event occurs. In one implementation, a specified heat element on the stove is boiling potatoes as per a program that is currently running. An incoming program to sauté mushrooms attempts to run on the same heat element but the application prevents the program from running and places the program on the queue. The program remains on the queue until a triggering event occurs. In this implementation, three triggering events are recognized by the stove. One triggering event is the placement of a pan, the triggering event is satisfied once the stove recognizes the pot boiling the potatoes is removed from the heat element and the pan for sautéing the mushrooms is placed on the heat element. The stove may recognize this by sensors that detect weight, once the pot is removed and the pan is placed on the heat element the queued program will begin. A second triggering event uses temperature sensors, once the temperature sensor on the stove recognizes that a pan with a temperature close to ambient temperature is placed on the heat element, the queued program will begin. A third triggering event is used on an induction stove, once heat begins transferring to the pan placed on the heat element the queued program begins.

If the cooking appliances and devices necessary for the program are not found, the application may respond by stopping the program and sending a notification to the device running the application. A notification may give the user the option to find the missing cooking appliances and devices and resume the program. Alternatively, a notification may alert the user that the program was canceled because of missing cooking appliances and devices.

Cooking recipes and programs may be selected from the application or an interface coupled to a cooking appliance. The interface may comprise a touchscreen and processor. The touchscreen may control the cookware, cooking devices, and cooking appliances with or without the aid of a cooking recipe of program. A database of cooking recipes and programs may be stored in an oven manufacturer's memory operably connected to visual interface provided, enabling a user to view and select from among the recipes and programs using a select function. The database may import, export, and sync recipes and programs with other devices and storage mediums.

A cooking recipe may have an associated program for carrying out cooking functions and allowing a user to follow a recipe step-by-step. As the user follows the steps of the recipe the associated program may carryout functions without the user having to take an active step, saving the user time. In one implementation, a user opens an application on his phone that contains recipes with associated programs. A user selects a recipe for stir fry and begins following the steps. An associated program for cooking stir fry runs concurrently as the user follows the recipe. Cooking actions may be carried out automatically by the cooking appliances, cookware, and cooking devices in accordance with the associated cooking recipe.

In another implementation, the application may be used to fetch cooking recipes and programs on the web or other storage mediums. Alternatively, all cooking recipes and programs could be made available on the web, in appropriate formats, for selection and download. Recipes and programs may vary depending on the cooking appliances and cookware a user owns. The cooking times and methods may be altered to be used on the specific cooking appliances and cookware.

The cooking device (e.g., stirrer) may have sensors that monitor the composition of the contents in the cookware. The composition may be monitored for various ingredients that provide tastes. For example, tastes of salt, sourness, bitterness and sweetness can be sensed. In one implementation, the cooking device may be equipped with a battery, a processor, a memory, a transmitter, a receiver, and a plurality of sensors. The cooking device may relay the data received from the contents in the cookware to the application. Alternatively, the cooking device may display the current status of the contents in the cookware with by signaling the cooking appliance.

The cooking device may interface with cooking recipes and programs described herein to assist a user in perfecting his cooking skills. Thus, it is no longer ones level of cooking expertise, cooking experience or knowledge of taste and spices that defines the outcome of the daily cooking. Instead, the cooking device personally assists a user in creating perfectly prepared meals by analyzing the contents in the cookware. In one application, the user would like to know the moisture content of a casserole cooking in the oven. It is important to know the moisture content of the casserole throughout the cooking process as water affects quality and consistency of the end product. Variations and excess moisture casseroles can result in clumping and inaccurate recipe formulas. Testing food moisture during this time will allow adjustments to be made throughout the baking process to manage moisture levels. Monitoring moisture, among other cooking variables is important, because variables affect the taste, appearance, consistency, stability as well as the shelf life of the finished product.

Figure 4:
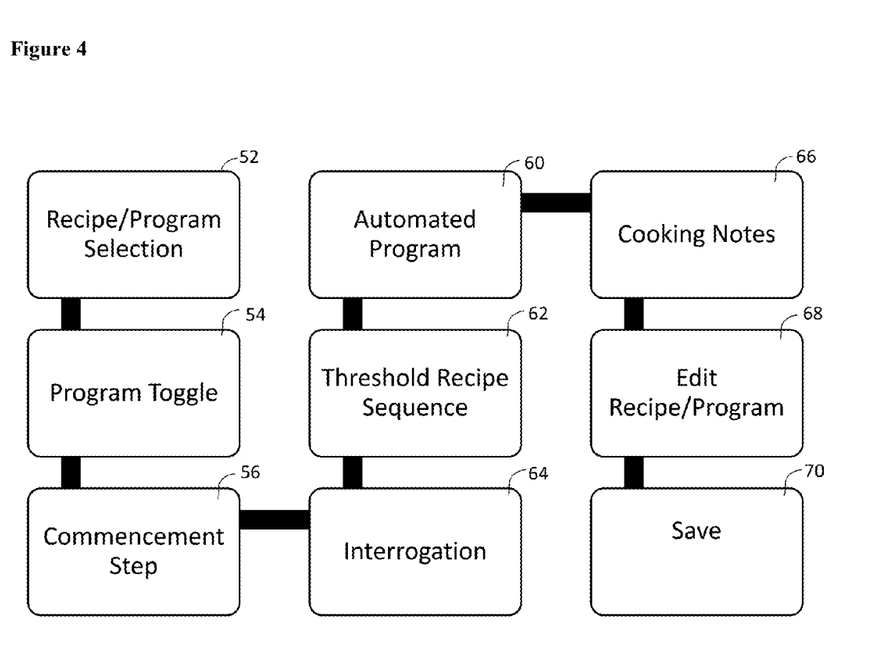
FIG. 4 is an example flowchart of a process performed by an application used with cooking apparatuses and methods.

FIG. 4 is an example flowchart of a process performed by an application used with cooking apparatuses and methods. Step 52 is a selection step, during this step the person chooses the cooking recipe and/or program. Step 54 is a program toggle step, during this step if a program associated with the selected recipe exists, the person will have the opportunity to select whether to run the associated program. Step 56 is a commencement step, during this step the person acknowledges the selected recipe and/or program. Step 56 is where the cooking procedures begin and time may begin to be recorded and sensors may be tracked for purposes of compiling batch information. Step 60 is an interrogation step that an application carries out in order to determine if all of the cooking apparatuses necessary for the selected cooking recipe and/or program are within range of the transceiver 32 of the device running the application. If a cooking apparatus is not found during the interrogation step the application will send a message prompt notifying the person of the missing apparatus. The person will then have the opportunity to remedy the missing cooking apparatus and continue with the cooking procedure. If the missing cooking apparatus could not be remedied then the application will cancel the cooking recipe and/or program. Once interrogation step 60 successfully identifies all necessary cooking apparatuses to carry out the cooking recipe and/or program the application will move to threshold sequence step 62.

In threshold recipe sequence step 62, each step of the recipe is performed, and the next step is not commenced until a threshold for the current step is reached. For example, if the current step calls for boiling water, the next step may not commence until a temperature sensor of the cookware boiling the water reaches a boiling temperature, or temperature greater than boiling. A threshold sequence step may automatically be carried out by an automated program step 64. An automated program step 64 may come from a cooking recipe's associated program. Automated program steps involve the application sending wireless commands to the transceivers 32 to a plurality of cooking apparatuses. In most cases, automated program steps 64 advantageously use the cooking apparatuses described herein to save a person time.

An application may save the batch information from each cooking process. Batch information may be saved and categorized by the application according to the recipe performed and in order of the time stamp of the batch information. Once all threshold recipe sequence steps 62 and automated program steps 64 are complete, the application may prompt the person to provide cooking notes 66 for the cooking process carried out. Cooking notes may contain information that describes the food produced in the cooking process or any recommendations for the recipe and/or program. A person may then receive a recipe/program edit prompt 68 to allow the person to make changes to the recipe and/or program. Lastly, the application may send a save recipe/program prompt 70. A save recipe/program prompt gives the person the option to save the recipe and/or program for future use.

An application allows for quality control of batches. When cooking many batches of the same food product, as seen in commercial environments, the information collected by the application can be reviewed to meet quality standards. Similarly, batch information may be reviewed after food products are sent back by consumers. The ability to check batch information allows for a quick and easy accounting of food products.

An application allows for new custom recipes and/or programs to be added manually by a person. A person can set the steps and associated thresholds for the cooking recipe and/or programs. A person may input clear instructions with desired cooking temperatures and cooking times. In addition, a person may explain method and ingredient tweaks to change recipes to preferences based on desired tastes. After inputting all steps and associated thresholds the person may review the recipe and/or program before deciding to save the recipe and/or program.

A person may start a cooking process based on a previously saved recipe and/or program. Alternatively, a person may select delete from options provided by an application to delete a previously saved recipe and/or program. Further, a person also has the option of editing cooking recipes and/or programs from options provided by an application.

Based on the above, it should be apparent that an application which functions to prompt a person to input cooking information in a convenient and clear manner and then automatically control cooking apparatuses to carry out the desired cooking procedures. It should be understood that the cooking application may run on Android, iOS, Microsoft, or an operating system used by cooking apparatuses, such as an interface with a screen connected directly to a cooking appliance. The person is guided through the cooking process of inputting recipes and/or programs in an easy-to-follow, step-by-step, manner. Thus, the likelihood of the cooked food product will be the desired product is greatly increased.

The material composition of a cooking apparatus should preferably a composition that allows for an exposure of 240° C. for fluids or up to 300° C. for applications in oil or grease. Further, it should be dishwater-resistant. Examples of the use of the cooking apparatus are measuring of grease quality, measuring of salt content, measuring of temperature. Also, measuring of taste compositions for certain taste directions is possible (e.g., vinegar content of marinades). The cooking device can help balance tastes, and meet tastes preferences, by measuring contents in cookware. Tastes preferences may be stored in memory, or controlled by settings on the application. An application may adjust cooking recipes and/or programs to accommodate the preferences and settings. One example taste preference, if the user prefers spicier dishes, an application may add twenty percent to all spice ingredients to a dish. So that if a creole recipe calls for five teaspoons of Tabasco, the application will automatically adjust the amount of Tabasco to six teaspoons.

Cookware Designed for Fully Automated Cooking

Cookware may be designed to store necessary ingredients to carry out a recipe. Cookware may store all of the ingredients or interface with a storage container to obtain the ingredients. Cookware must open or remove any lid to allow ingredients to be added. Cookware may use actuators to obtain ingredients from a storage container. The actuators are moved to the open position, with the actuating magnet engaging the door to the storage container. The ingredient containers define cups for receiving ingredients. For a specific recipe, specific types and amounts of ingredients will be required. The separate ingredients are placed into separate ingredients containers, or mixed with other ingredients which are required to be added at the same time during a cooking recipe and/or program. Once the required ingredients have been added, which may fill some or all of the ingredient containers, the actuating rods are pulled downwards to a closed position and storage container door is closed. The lid may then cover the cookware.

The application has a release time for each ingredient containers in accordance with the required steps of the recipe and/or program. Alternatively, a person may manually input a series of specific release times relating to each ingredient container, together with an overall cooking time for the recipe. However, the preferred embodiment is for the application to be pre-programmed with cooking recipes and/or programs so that upon selection of a recipe, the cooking apparatuses carryout the cooking procedure.

The application is also linked to the heating settings of the cooking appliance to control duration and temperature of heating. Specific ingredient containers may be released into the cookware by the application at programmed times. Cookware may move the automated lid at the opportune moment for the addition of ingredients. Opening the lid at a pre-programmed time will allow steam to exit the cookware and will allow the material to cool. (A steam release valve could also be mounted on the upped side of the pot to allow heat and steam to be released from the pot.) Similarly, the lid may be opened and closed at a time interval to release moisture and reduce spillover possibilities.

Example Use Cases

To create maple syrup or candy, hours of boiling may be required, then heating must stop. Cooking apparatuses can aid in the cooking process. Specifically, cookware can communicate the temperature of the contents to the stove to continue heating the cookware until the desired temperature is reached. For example, maple sap becomes maple syrup when boiled to 219 degrees Fahrenheit. When the cookware senses the contents have reached a temperature of 219 degrees Fahrenheit, the cookware can signal the stove to turn off the heat. The volumetric sensor may record the volumes at time intervals during the cooking process. Starting and ending volumes may be important for knowing the starting volume of sap needed to make an ending volume of syrup. All sensed data may be saved as batch information on the cooking apparatuses or application. The next example shows how the application may interact with the cooking process.

To make rice, the rice may be placed in cookware with water. Then the cookware may be placed on the stove. In this particular example, the cookware has an automated lid. A person may now use a smart phone to select a recipe and/or program 52 for cooking the rice. The recipe includes the necessary measurements of rice, water, butter, and salt along with cooking times. The person then selects to toggle the program 54 on so that the recipe may commence 56. The person is now free to leave the cooking area and come back when the application sends the cooking notes option 66. Interrogation 64 recognizes that all necessary cooking apparatuses are present and the cookware is on the burner. The threshold recipe sequence 62 and automated program 60 run concurrently to cook the rice. The automated program 60 sets the burner to high heat and vents the cookware once the temperature passes a threshold temperature via the automated lid. Cookware may be vented based on the internal pressure of the contents to prevent an unwanted cooking environment. The recipes first threshold recipe sequence 62 requires the temperature of the contents to reach 212 degrees Fahrenheit. The automated program 60 then sets a one minute timer before reducing the heat to medium-low, allowing the rice to simmer and absorb the remaining water.

The recipe calls for six minutes of simmering so the associated program 60 sets a six minute timer before the application signals the stove to turn the burner off and notifies the user the rice is done. The person may then go to the cooking area and inspect/taste the rice. From the time the stove was turned on until the stove was turned off, the cooking apparatuses will record sensed data to be saved as batch information. The application allows the person to add cooking notes 66 then edit the recipe and program 68 as desired. The person can then save 70 the recipe, program, and/or batch information. Batch information may indexed and date stamped to be accessed through the application at a later time.

In another example, a milk heating recipe could be downloaded to the cookware to specify how to heat milk without scalding by instructing the stirrer to stir the milk while the stove is slowly warming the pot, and monitoring the temperature of the milk to prevent the heat from getting so hot that the milk scalds.

Cooking apparatus' sensors and cooking devices may play a critical role in some cooking processes. For example, when cooking gravy it may be vital to sense the viscosity. Magnetic coils may send an electromotive force through the gravy to determine the flux. The flux can monitor the viscosity as the gravy's viscosity will change depending on temperature, pressure, and composition. A stirrer and scrapper may help thicken the gravy during the cooking process and prevent the gravy from burning to the cookware. Thick foods (e.g., oatmeal, stew) and foods high in sugar may burn at the bottom to cookware. To prevent this burn, a Bluetooth scrapper may be activated during heating. Similar cooking methods may be employed for more advanced recipes, such as a recipe for Béchamel sauce.

Commercial use of cooking apparatuses and an application described are advantageous for quality control and efficiency purposes. The automated cooking processes described reduces the time commercial cooks need to be present in the cooking area. The automated recording of batch information allows commercial cooks to quickly review and analyze any inconsistencies in cooking processes for quality control purposes. The application allows for cooking processes in the form of recipes and programs to be added, removed, and edited.

The foregoing devices and operations, including their implementation, will be familiar to, and understood by, those having ordinary skill in the art. The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A system for cooking in a kitchen using a smart phone, an intelligent heating device and a cooking apparatus, the system comprising:
   the smart phone, the smart phone comprising:
      a smart phone data transceiver for communicating with the cooking apparatus and the intelligent heating device;
      an application for receiving and sending messages through the smart phone data transceiver to the cooking apparatus, the application receiving data from the cooking apparatus regarding the cooking of a cooking product;
   the intelligent heating device, comprising:
      a processor;
      an intelligent heating device transceiver electrically connected to the processor, for wireless communicating with the cooking apparatus, wherein communications with the cooking apparatus include instructions from the cooking apparatus to the intelligent heating device regarding the cooking of the cooking product; and
      a heating element electrically connected to the processor;
   the cooking apparatus, comprising:
      a base for conducting heat from the heating element into the cooking apparatus;
      walls mechanically attached to the base, the walls for containing contents within the cooking apparatus;
      a handle mechanically attached to the walls of the cooking apparatus;
      a computing device mechanically located in the handle, the computing device comprising:
         a processor;
         a cooking apparatus transceiver electrically connected to the processor, for wireless communicating with the smart phone, wherein communications with the smart phone include data sent to the smart phone from the cooking apparatus regarding the cooking of the cooking product and instructions sent from the cooking apparatus to the intelligent heating device regarding the cooking of the cooking product;
         a volume sensor for determining a volume of cooking product in the cooking apparatus, the volume sensor mechanically located in the walls of the cooking apparatus and electrically connected to the processor;
         a power supply electrically connected to the processor and the cooking apparatus transceiver.

2. The cooking apparatus of claim 1 further comprising a viscosity sensor for monitoring viscosity of contents within the cooking apparatus, the viscosity sensor mechanically located in the walls or base of the cooking apparatus and electrically connected to the processor.

3. The cooking apparatus of claim 1 further comprising a smell sensor for monitoring smell of contents within the cooking apparatus, the smell sensor mechanically located in the walls of the cooking apparatus and electrically connected to the processor.

4. The cooking apparatus of claim 1 further comprising a pressure sensor for monitoring the pressure within the cooking apparatus, the pressure sensor mechanically located in the walls or base of the cooking apparatus and electrically connected to the processor.

5. The cooking apparatus of claim 1 further comprising a gradient temperature sensor for monitoring temperature of contents within the cooking apparatus, the gradient temperature sensor mechanically located in the walls of the cooking apparatus and electrically connected to the processor, wherein the gradient temperature sensor consists of a string of evenly spaced temperature sensors.

6. The cooking apparatus of claim 1 further comprising a saline sensor for monitoring salinity of contents within the cooking apparatus, the saline sensor mechanically located in the walls or base of the cooking apparatus and electrically connected to the processor.

7. The cooking apparatus of claim 1 wherein the power supply converts heat into electricity for powering the computing device.

8. The cooking apparatus of claim 1 wherein the handle incorporates a reservoir for storing water or broth.

9. The cooking apparatus of claim 8 wherein the reservoir automatically dispenses the liquid into the cooking apparatus under control of the processor.

10. The cooking apparatus of claim 1 further comprising a vent mechanically located on the walls of the cooking apparatus, wherein the processor is electrically connected to the vent and automatically controls a release of heat from within the cooking apparatus.

11. An intelligent cooking apparatus for use in a kitchen comprising:
- a base for conducting heat from an intelligent stove heating element into the cooking apparatus;
- walls mechanically attached to the base, the walls for containing contents within the cooking apparatus;
- a handle mechanically attached to the walls of the cooking apparatus;
- a computing device mechanically located in the handle, the computing device comprising:
  - a processor;
  - a transceiver electrically connected to the processor, for wireless communicating with a smart phone, wherein communications with the smart phone include data sent to the smart phone from the cooking apparatus and instructions sent to the intelligent stove heating element regarding the parameters for cooking a cooking product;
- a plurality of different types of sensors electrically connected to the processor, wherein the sensors monitor the cooking product within the cooking apparatus, the sensors mechanically located in the walls and base of the cooking apparatus;
- a power supply electrically connected to the processor and the transceiver.

12. The intelligent cooking apparatus for use in the kitchen of claim 11 wherein at least one of the sensors include a viscosity sensor.

13. The intelligent cooking apparatus for use in the kitchen of claim 11 wherein at least one of the sensors include a volume sensor.

14. The intelligent cooking apparatus for use in the kitchen of claim 11 wherein at least one of the sensors include a pressure sensor.

15. The intelligent cooking apparatus for use in the kitchen of claim 11 wherein at least one of the sensors include a gradient temperature sensor, wherein the gradient temperature sensor consists of a string of evenly spaced temperature sensors.

16. The intelligent cooking apparatus for use in the kitchen of claim 11 wherein at least one of the sensors include a saline sensor.

17. The intelligent cooking apparatus for use in the kitchen of claim 11 wherein the power supply converts heat into electricity for powering the computing device.

18. The intelligent cooking apparatus for use in the kitchen of claim 11 wherein the handle incorporates a reservoir for storing water or broth.

19. The intelligent cooking apparatus for use in the kitchen of claim 18 wherein the reservoir automatically dispenses the liquid into the cooking apparatus under control of the processor.

20. The intelligent cooking apparatus for use in the kitchen of claim 11 further comprising a vent mechanically located on the walls of the cooking apparatus, wherein the processor is electrically connected to the vent and automatically controls a release of heat from within the cooking apparatus.

* * * * *